(12) United States Patent
Kojima et al.

(10) Patent No.: US 6,987,768 B1
(45) Date of Patent: Jan. 17, 2006

(54) PACKET TRANSFERRING APPARATUS

(75) Inventors: Yuji Kojima, Kanagawa (JP); Tetsumei Tsuruoka, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/552,134

(22) Filed: Apr. 19, 2000

(30) Foreign Application Priority Data

Jun. 2, 1999 (JP) .......................... 11-155411

(51) Int. Cl.
 *H04L 12/28* (2006.01)
 *H04L 12/56* (2006.01)

(52) U.S. Cl. ................... 370/401; 370/428; 370/412

(58) Field of Classification Search ............. 370/428, 370/429, 412, 413, 415, 351–357, 395.42, 370/392, 389, 399, 400, 401, 409, 230, 235, 370/236, 395.52; 709/227, 228, 229; 713/160, 713/161, 168
See application file for complete search history.

(56) References Cited

U.S. PATENT DOCUMENTS

| | | | | | |
|---|---|---|---|---|---|
| 5,841,990 | A | * | 11/1998 | Picazo et al. ............... | 709/249 |
| 5,940,390 | A | * | 8/1999 | Berl et al. .................. | 370/389 |
| 6,247,060 | B1 | * | 6/2001 | Boucher et al. ............ | 709/238 |
| 6,400,722 | B1 | * | 6/2002 | Chuah et al. ............... | 370/401 |
| 6,426,955 | B1 | * | 7/2002 | Gossett Dalton et al. ... | 370/401 |
| 6,510,151 | B1 | * | 1/2003 | Cioli et al. ................. | 370/352 |
| 6,563,793 | B1 | * | 5/2003 | Golden et al. ............. | 370/236 |
| 6,587,433 | B1 | * | 7/2003 | Borella et al. ............. | 370/230 |
| 2002/0024945 | A1 | * | 2/2002 | Civanlar et al. | |

* cited by examiner

*Primary Examiner*—Ajit Patel
(74) *Attorney, Agent, or Firm*—Kattten Muchin Zavis Rosenman

(57) ABSTRACT

In a packet transferring apparatus which communicates between terminals belonging to networks, a packet outputted from a main processor for executing a routing process, a filtering process, and a priority control process determined whether or not to be conformed with a session establishment condition, when the packet is determined conformable, packet information is received and held from the determining portion, and subsequent packets belonging to the same session are transmitted by bypassing the main processor, based on the packet information.

12 Claims, 11 Drawing Sheets

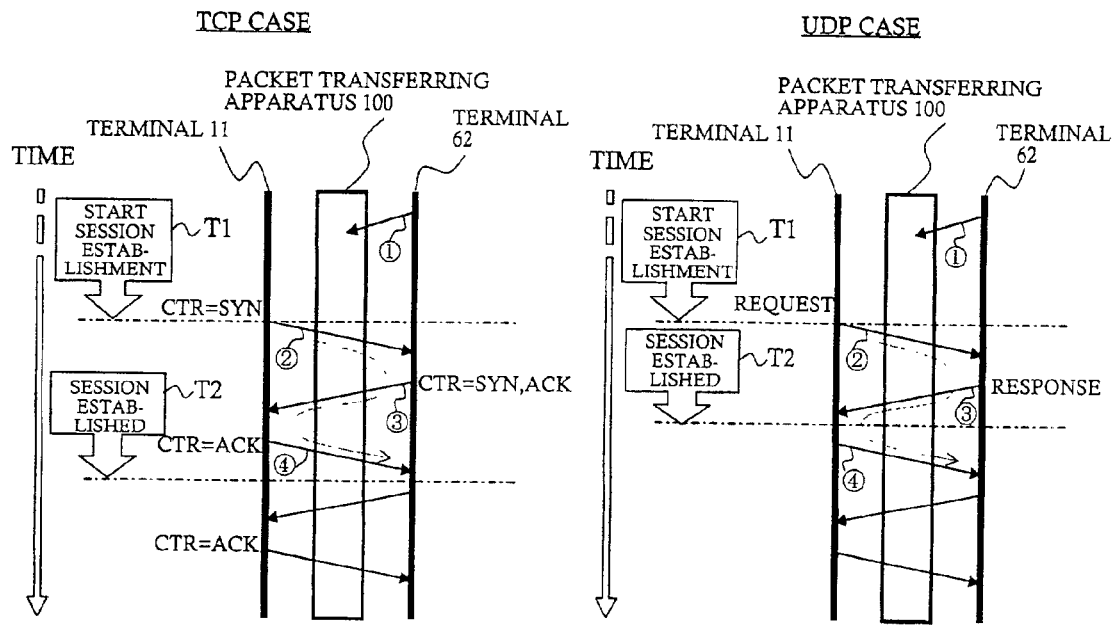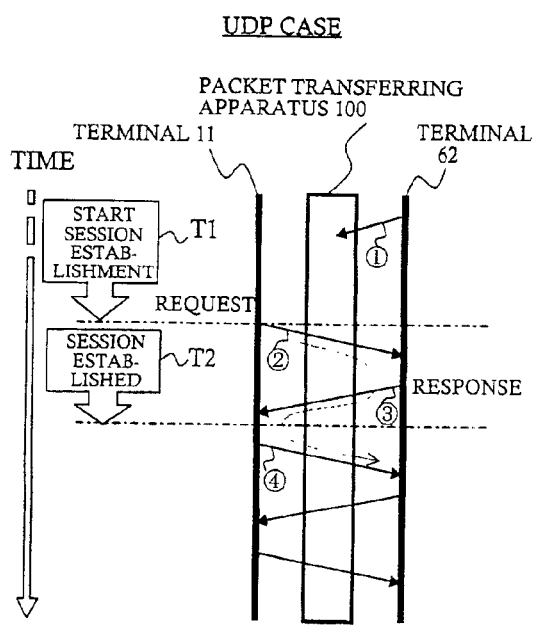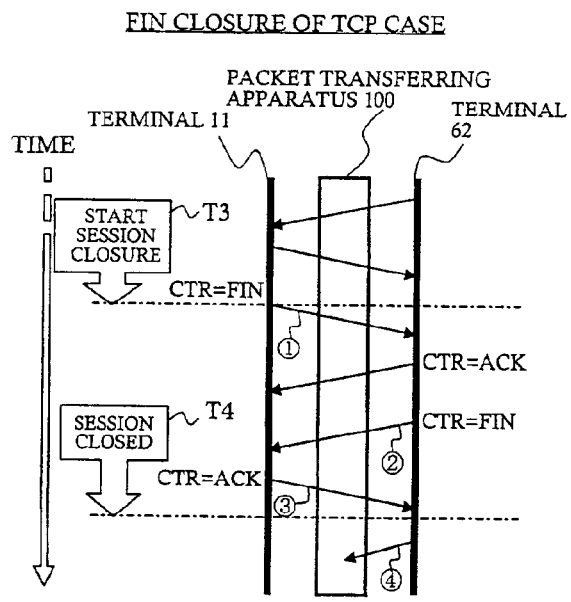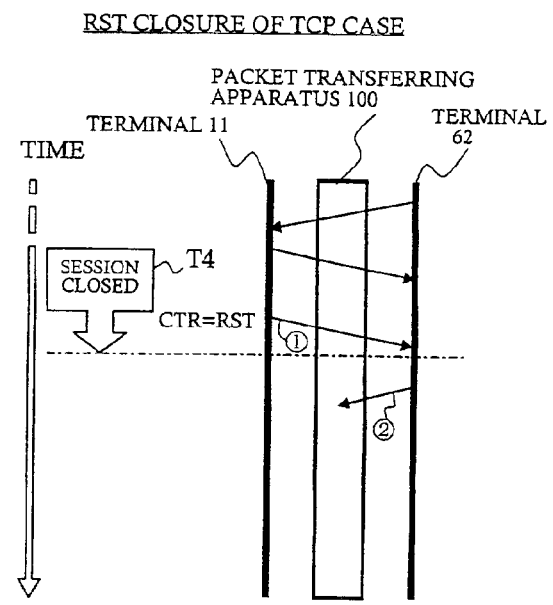

FIG.5A  SESSION ESTABLISHMENT CONDITION TABLE

| PROTO-COL NO. | SOURCE IP ADDRESS | DESTINATION IP ADDRESS | SOURCE PORT NO | DESTINA-TION PORT NO. | RECEIV-ING INTER-FACE | TRANS-MITTING INTER-FACE | PRIORITY DEGREE /TRANS-FER | |
|---|---|---|---|---|---|---|---|---|
| TCP | 192.168.10.0 | 192.168.60.0 | | 23 | | | 7 | 801 |
| UDP | | | | 53 | IF1 | | TRANS-FER | 802 |
| UDP | | | | 53 | IF2 | | TRANS-FER | 803 |
| UDP | | | | 53 | IF3 | | TRANS-FER | 804 |
| | | | | | | | | |
| | | | | | | | | |

FIG.5B  MASK DATA TABLE

| 1 | 255.255.255.0 | 255.255.255.0 | 00···0 | 11···1 | 00···0 | 00···0 | 805 |
|---|---|---|---|---|---|---|---|
| 1 | 0.0.0.0 | 0.0.0.0 | 00···0 | 11···1 | 11···1 | 00···0 | 806 |
| | | | | | | | |
| | | | | | | | |

FIG.5C  UDP SESSION ESTABLISHMENT DATA TABLE

| DESTINATION PORT NO. AT UPD | REQUEST | |
|---|---|---|
| 53 | 01···0 | 807 |
| | | |
| | | |
| | | |

FIG.5D  MASK DATA TABLE

| |
|---|
| 11···1 |
| |
| |

FIG.6

| PROTO-COL NO. | SOURCE IP ADDRESS | DESTINATION IP ADDRESS | SOURCE PORT NO. | DESTINA-TION PORT NO. | RECEIV-ING INTER-FACE | TRANSMIT-TING INTERFACE | PRIORITY DEGREE /TRANS-FER | TIME STAMP | FIN COUNT-ER | DESTINA-TION MAC ADDRESS | SOURCE MAC ADDRESS |
|---|---|---|---|---|---|---|---|---|---|---|---|
| TCP | 192.168.10.1 | 192.168.60.2 | 1023 | 23 | IF1 | IF4 | 7 | 0 | 0 | 00:00:⋯:52 | 00:00:⋯:c0 |
| | | | | | | | | | | | |
| | | | | | | | | | | | |
| | | | | | | | | | | | |
| | | | | | | | | | | | |

901

FIG.9A CAM-1

| INDEX 1 | PROTO-COL NO. | DESTINA-TION PORT NO. | RECEIV-ING INTER-FACE | TRANSMIT-TING INTER-FACE |
|---|---|---|---|---|
| | | | | |
| | | | | |
| | | | | |
| | | | | |
| | | | | |
| | | | | |

FIG.9B CAM-2

| INDEX 2 | SOURCE IP ADDRESS |
|---|---|
| | |
| | |
| | |
| | |
| | |
| | |

FIG.9C CAM-3

| INDEX 3 | DESTINA-TION IP ADDRESS |
|---|---|
| | |
| | |
| | |
| | |
| | |
| | |

FIG.9D CAM-4

| INDEX 4 | SOURCE PORT NO. | PRIORITY DEGREE /TRANS-FER | TIME STAMP | FIN COUNT-ER | DESTINATION MAC ADDRESS POINTER | SOURCE MAC ADDRESS POINTER |
|---|---|---|---|---|---|---|
| | | | | | | |
| | | | | | | |
| | | | | | | |
| | | | | | | |
| | | | | | | |
| | | | | | | |

FIG.9E CAM-5

| INDEX 1 | INDEX 2 | INDEX 3 | INDEX 4 |
|---|---|---|---|
| | | | |
| | | | |
| | | | |
| | | | |
| | | | |
| | | | |

LAN1→LAN6 : HIGH PRIORITY
LAN1←LAN6 : NON-PERMISSIBLE COMMUNICATION

FIG.12A  FILTERING CONDITION TABLE

| | PROTO-COL NO. | SOURCE IP ADDRESS | DESTINATION IP ADDRESS | SOURCE PORT NO. | DESTINA-TION PORT NO. | RECEIV-ING INTER-FACE | TRANS-MITTING INTER-FACE | TRANS-FER/ABAN-DON-MENT | |
|---|---|---|---|---|---|---|---|---|---|
| | TCP | 150.56.0.0 | 10.0.0.0 | | | | | ABANDON-MENT | 301 |
| | TCP | 150.57.0.0 | 10.0.0.0 | | | | | ABANDON-MENT | 302 |
| | UDP | 192.168.20.1 | | | | IF2 | | ABANDON-MENT | 303 |
| | UDP | | 192.168.20.1 | | | | IF2 | ABANDON-MENT | 304 |
| | TCP | 192.168.60.0 | 192.168.10.0 | | | | | ABANDON-MENT | 305 |
| | | | | | | | | | |

CONDITION: 301–305

FIG.12B  MASK DATA TABLE

| | | | | | | | | |
|---|---|---|---|---|---|---|---|---|
| 1 | 255.255.0.0 | 255.0.0.0 | 00···0 | 00···0 | 00···0 | 00···0 | 306 |
| 1 | 255.255.255.255 | 0.0.0.0 | 00···0 | 00···0 | 11···1 | 00···0 | 307 |
| 1 | 0.0.0.0 | 255.255.255.255 | 00···0 | 00···0 | 00···0 | 11···1 | 308 |
| 1 | 255.255.255.0 | 255.255.255.0 | 00···0 | 00···0 | 00···0 | 00···0 | 309 |

MASK DATA: 306–309

POINTER

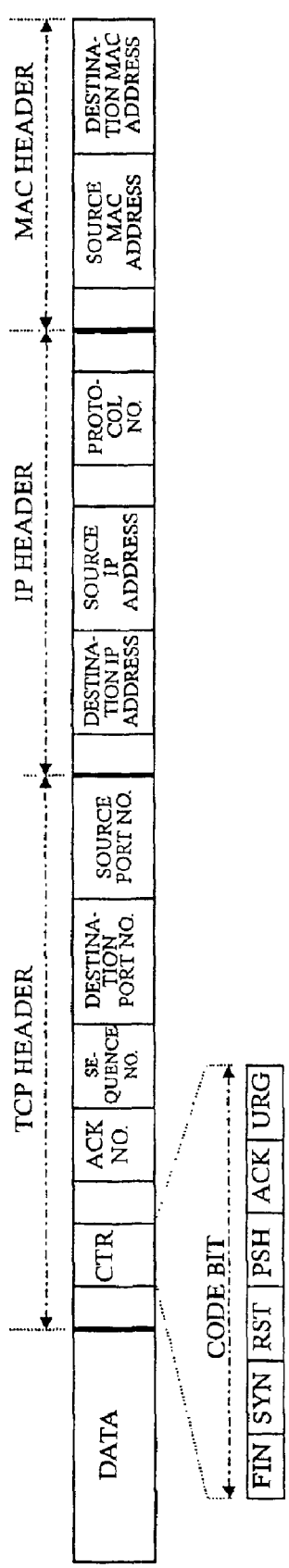
FIG.13A  TCP PACKET FORMAT
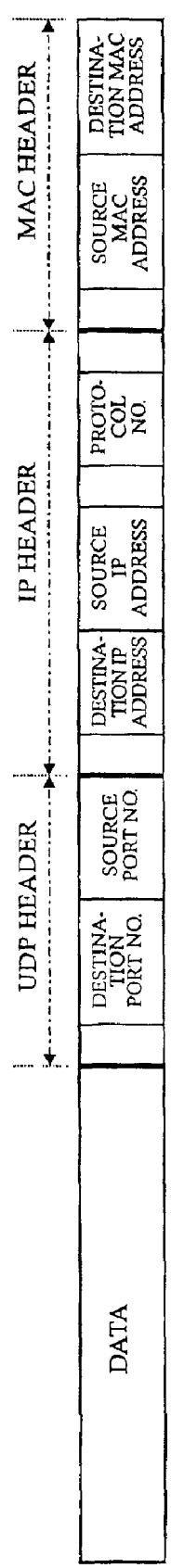
FIG.13B  UDP PACKET FORMAT

PACKET TRANSFERRING APPARATUS

BACKGROUND OF THE INVENTION

1. Field of the Invention

The present invention relates to a packet transferring apparatus, and in particular to a packet transferring apparatus which executes a packet transfer in a network having terminals connected by the TCP (Transmission Control Protocol) communication or the UDP (User Datagram Protocol) communication.

As the utilization of the network for communication between terminals (hereinafter occasionally referred to as inter-terminal communication) extends, a relay between the networks, e.g. a mutual connection between LAN's (Local Area Networks), or an LAN and a leased line becomes necessary for enlarging the scale of the network.

In the network thus constructed, the IP (Internet Protocol) network is the mainstream at present. This IP is a protocol of connectionless type corresponding to the network layer in the OSI (Open Systems Interconnection) model of the ISO (International Organization for Standardization).

In the IP communication of connectionless type, different from a connection type of protocol which preliminarily secures a channel between the terminals, the packet transferring apparatus which mutually connects the LAN's performs a transfer process of a packet storing therein communication data whereby the inter-terminal communication is realized.

In order to realize a connection-type communication by using the connectionless-type IP communication, it is required that a connection called "session" is established by the TCP corresponding to an upper transport layer and session layer and then the inter-terminal communication is performed.

On the other hand, when a connectionless-type packet communication is performed between the terminals, a connectionless-type UDP is substituted for the TCP. Which of the TCP or the UDP should be used for the communication depends on the selection of an application which performs the inter-terminal communication.

2. Description of the Related Art

FIG. 10 shows a general network arrangement where a packet transferring apparatus mutually connects a plurality of LAN's.

In this arrangement, terminals connected to the same LAN mutually and directly communicate not through the packet transferring apparatus. For example, terminals 11 and 13 connected to a LAN1 can communicate mutually and directly by transmitting/receiving a packet through the LAN1.

On the other hand, terminals not connected to the same LAN communicate mutually through a plurality of packet transferring apparatuses and LAN's.

In the communication between terminals 11 and 62, for instance, the packet transmitted from the terminal 11 is relayed through the route of LAN1→packet transferring apparatus 1→LAN4→packet transferring apparatus 2→LAN5→ packet transferring apparatus 3→ LAN6 in this order to be received at the terminal 62. The packet transmitted from the terminal 62 is relayed in the order reverse to the above-mentioned order to be received at the terminal 11. In this way, the communication between the terminals 11 and 62 is realized. At this time, the packet transferring apparatus 1 receives the packet transmitted from the terminal 11 at an interface IF1 connected to the LAN1, determines, from field values of a header portion which stores therein control information of the packet such as a destination address in the packet, an interface IF4 connected to the LAN4 as an interface to which the packet is to be transmitted, and transmits the packet from this interface IF4. In the same way, the interface IF4 performs a packet transferring process of receiving the packet transmitted from the terminal 62 and transmitting the packet from the interface IF1 to the LAN1.

The packet transferring apparatuses, e.g. packet transferring apparatuses 1–3 in the network arrangement of FIG. 10, executes such a packet transferring process, so that the inter-terminal communication is realized.

On the other hand, the packet transferring apparatus also has a general function of prohibiting a specific communication on the network and preventing an illegal access as a part of a network management not only by transferring a packet but also abandoning a specific packet without being transferred.

To permit/prohibit the communication between specific terminals, specific terminal groups, specific LAN's, and specific applications is made possible by a "filtering process" for the packet transferring apparatus to transfer/ abandon a specific packet.

In the network arrangement of FIG. 10, for instance, regarding the communication between the terminal 22 connected to the LAN2 and the terminal group connected to the LAN1, when a network management person performs such a network management that the communication between the terminals 22–11 is permitted, and the other communications between the terminals 22–12 and the terminals 22–13 are prohibited, the packet transferring apparatus 1 transfers only the packet whose source address and destination address respectively designate the terminals 22 and 11, and the packet whose source address and destination address respectively designate the terminals 11 and 22.

The filtering process is executed such that the packet is abandoned when the packet does not meet the above-mentioned condition, the source address designates the terminal 22, and the upper bit of the destination address designates the terminal connected to the LAN1.

Generally in the IP network, the terminal connected to the same LAN belongs to the same subnetwork, and the upper bit within a predetermined range in the addresses of the terminals becomes equal. The above-mentioned filtering process enables a network management person or a network manager to perform such a network management that the communication between the terminal 22 and the terminal group connected to the LAN1 is prohibited except the communication between the terminals 22–11.

In the same way as the above-mentioned example, the network manager combines various filtering conditions for determining the transfer/abandonment per packet to be set in the packet transferring apparatus. Thus, the network manager can perform such a security control of a more complicated network that a necessary communication is permitted while the illegal access from an external network outside the company such as LAN4, LAN5, and LAN6 is controlled supposing that e.g. the LAN1, the LAN2, and the LAN3 in FIG. 10 is made an internal network of the company, and the interface IF4 of the packet transferring apparatus 1 is made an interface with the outside of the company.

In addition, a "priority control" of not only permitting/ prohibiting a specific communication on the network but also treating a specific communication prior to other communications is realized by the packet transferring apparatus distinguishing a packet of a specific communication and preferentially processing the distinguished packet.

This priority control process is the same as the filtering process in that the packet transferring apparatus distinguishes a specific packet. However, the filtering process and the priority control process are different from each other in that the former process renders the packet transferring apparatus transfer/abandon the packet after being distinguished while the latter process renders it give priority to the packet.

In the network arrangement of FIG. 10, for instance, when the network manager performs such a network management that the communication between the terminal 31 which is a server providing an important service to other terminals and the other terminals is processed prior to the other communications, the packet transferring apparatus 1 is set to transfer the packet with a high priority whose destination address or source address in the header designates the terminal 31. The packet transferring apparatus 1 executes such a priority control process to enable the priority control of the communication between the terminal 31 and the other terminals.

A conventional packet transferring apparatus executes the above-mentioned security control and priority control by a process arrangement shown in FIG. 11. When the packet transferring apparatus 100, which generally denotes the above-mentioned apparatuses 1–3, performs the security control, for instance, the network manager preliminarily performs setting to a security control software 102 composing a software portion 101 based on the management policy of the network.

The security control software 102 converts the setting into a form conformable with filtering entries of a filtering table 108 in a hardware portion 104. The security control software 102 requests a filtering processor 109 in the hardware portion 104 to store the converted entries in the filtering table 108.

The filtering processor 109 stores the entries requested from the security control software 102 in the filtering table 108.

In this procedure, the packet transferring apparatus 100 preliminarily stores the filtering entries in the filtering table 108. When the filtering processor 109 compares the received packet with the entries of the filtering table 108 by the field values so that there is found a relevant entry for the received packet, the received packet is transferred or abandoned depending on a value (e.g. "1" for transfer, and "0" for abandonment) of a "transfer/abandonment field" within the relevant entry.

In the same manner, when the packet transferring apparatus 100 performs the priority control, the network manager preliminarily performs setting to a priority control software 103 composing the software portion 101 based on the management policy of the network. The priority control software 103 converts the setting into a form conformable with entries of a priority control table 110 in the hardware portion 104.

The priority control software 103 requests a priority control processor 111 in the hardware portion 104 to store the converted entries in the priority control table 110. The priority control processor 111 stores the entries requested from the priority control software 103 in the priority control table 110.

In this procedure, the packet transferring apparatus 100 preliminarily stores the priority control entries in the priority control table 110. When the priority control processor 111 compares the received packet with the entries of the priority control table 110 by the field values so that there is found a relevant entry for the received packet, the packet transferring apparatus 100 preferentially transfers the received packet depending on a value (e.g. "o"-"7") of a "priority degree field" within the relevant entry.

Also, since the above-mentioned filtering processor 109 and the priority control processor 111 retrieve the filtering table 108 and the priority control table 110 based on a transmitting interface of the packet, a routing processor 107 and a routing table 106 are arranged at the preceding stage of the filtering processor 109 and the priority control processor 111.

It is to be noted that since the process performed by the priority control processor 111 to the packet which is to be determined to be abandoned at the filtering processor 109 is wasteful, the filtering processor 109 is generally arranged at the preceding stage of the priority control processor 111.

Hereinafter, each of the processors mentioned above will be described as a series of transferring process operations which the packet transferring apparatus 100 shown in FIG. 11 performs to the received packet.

When the packet arrives at a receiving interface, the routing processor 107 retrieves the routing table 106 based on the destination address (e.g. the destination IP address in the IP communication), and determines an interface to which the received packet is transmitted and an MAC (Media Access Control) address of the transmitting packet at that time.

The routing processor 107 transmits the received packet to the next processor of the filtering processor 109, and notifies the transmitting interface and the MAC address determined by the above-mentioned routing processor 107 to the filtering processor 109.

The MAC address is one for identifying relaying equipment (not shown) connected to the LAN or the interface of the terminal, and is required for the communication between the terminals connected to the same LAN and the relaying equipment.

The correspondence between the transmitting interface and the MAC address for the destination IP address in the routing table 106 is either preliminarily inputted by the network manager or stored by the communication of an apparatus control software with the relaying equipment adjoining thereto.

Also, as a method of notifying the packet together with the information annexed to the packet to the next processor such that a transmitting interface No. and the MAC address determined by the above-mentioned routing processor 107 are notified to the filtering processor 109, an in-apparatus controlling header can be added e.g. ahead of a packet header, which will be described later referring to FIGS. 13A and 13B, by the preceding processor, which can store the information to be notified to the next processor in the specific field of the in-apparatus controlling header.

The filtering processor 109 which has received the packet from the routing processor 107 retrieves the filtering table 108 based on the field values within the packet header and the transmitting/receiving interface of the received packet. When the received packet coincides with the filtering condition for abandonment, the packet is abandoned. Otherwise, the packet is transferred to the next processor of the priority control processor 111.

The priority control processor 111 retrieves the priority control table 110 based on the field values within the packet header and the transmitting/receiving interface Nos. of the received packet. When the received packet conforms with a specific entry, the priority degree stored in that entry and the packet are transferred to the next processor of a switch portion 112.

The switch portion 112 stores the received packet in each of transmitting queues 113 in a packet scheduling processor 114 depending on the transmitting interface No. and the priority degree of the packet.

In the packet scheduling processor 114, for instance, three queues for each transmitting interface 115 are prepared, as shown in FIG. 11. Assuming the packet transferring apparatus 100 has eight priority degrees between "0–7", "0–2" are assigned to low priority queues, "3–5" to medium priority queues, and "6–7" to high priority queues.

The packet scheduling processor 114 takes out the packet from the queues depending on a packet scheduling method to be transmitted to the transmitting interface 115.

As the above-mentioned packet scheduling method, there is known a method by way of a simple one that the packet is transmitted firstly from the queue 113 storing the packet with a higher priority degree and when the queue with a higher priority degree is empty the packet is transmitted from the queue 113 with the next higher priority degree.

By transmitting the packet firstly depending on the priority degree of the packet in this way, the packet transferring apparatus 100 can perform a priority transfer control to finally transmit the packet from the transmitting interface 115.

The structure of the filtering table 108 will be more specifically described by referring to FIGS. 12 and 13.

In case of the IP, for instance, the table 108 is composed of a filtering condition table and a mask data table, as respectively shown in FIGS. 12A and 12B corresponding to the field values (protocol No., source IP address, destination IP address, source port No., destination port No., receiving interface No., and transmitting interface No.) within the header of an IP packet format shown in FIG. 13.

Each of the entries of the filtering condition table is related to each of the entries of the corresponding mask data table by a pointer, as shown in FIGS. 12A and 12B. The filtering condition table stores a packet condition when the packet transferring apparatus performs the filtering process, and the mask data table stores a bit string of "0" or "1" indicating whether or not the field values of the filtering conditions are significant.

In a filtering condition 301 of the filtering condition table, for instance, three conditions of the protocol No., the source IP address, and the destination IP address are set, while the other source port No., destination port No., receiving interface No., and transmitting interface No. are not set.

Accordingly, as for mask data 306 corresponding to the filtering condition 301, the field values of the source port No., the destination port No., the receiving interface No., and the transmitting interface No. are set to " 00 . . . 0" as the bit string.

Furthermore, the source IP address is "150.56.0.0" (equivalent to the bit string 10010110 00111000 00000000 00000000) in the filtering condition 301, while the source IP address of the corresponding mask data 306 is "255.255.0.0" (equivalent to the bit string 11111111 11111111 00000000 00000000).

Accordingly, not only the packet whose source IP address is "150.56.0.0" but also all of the packets whose source IP address is "150.56.(0–255).(0–255)" conform with the condition of the source IP address in the filtering condition 301.

Likewise, as for the destination IP address in the filtering condition 301, all of the packets whose destination IP address is "10.(0–255).(0–255).(0–255)" conform with the condition of the destination IP address in the filtering condition 301.

Namely, mask values of the mask data table designate the range in which the field values of the entries in the filtering condition table are conformed with the field value within the packet header.

It is not necessary that the total number of the entries set in the mask data table is equal to the total number of the entries set in the filtering condition table. Since the pattern of the mask data for the filtering condition 302 is equal to that for the filtering condition 301, for instance, the total number of the entries set in the mask data table can be fewer than that set in the filtering condition table by setting the pointer of a filtering condition 302 to designate the mask data 306.

It is to be noted that while the "protocol No." of the filtering condition table is represented by the characters of "TCP" or "UDP", it is to be stored in a storage device (not shown) with corresponding bits such as "0" for TCP and "1" for UDP when the storage device in the hardware portion 104 of the packet transferring apparatus 100 mounts thereon the filtering condition table.

Similarly, while "transfer/abandonment" of the filtering condition table is represented by the characters "transfer" or "abandonment", it is to be stored in the storage device with corresponding bits such as "0" for transfer and "1" for abandonment when the storage device in the hardware portion 104 mounts thereon the filtering condition table.

The priority control table 110, like the filtering table 108, has a priority condition table and the mask data table, has the fields of the protocol No., the source IP address, the destination IP address, the source port No., the destination port No., the receiving interface No., and the transmitting interface No. as the fields of the priority control condition table and the mask data table, and has a table structure in which the "transfer/abandonment" field of the filtering condition table is replaced by the "priority degree".

When the hardware portion 104 mounts thereon the above-mentioned filtering table 108 and the priority control table 110, the storage device generally called a CAM (Content Addressable Memory) is used.

The CAM, different from the other memory or the like, does not compare the entry in the memory with the field value within the packet which is a retrieval key one by one, but can simultaneously compare the retrieval key with all of the entries in parallel, thereby enabling the corresponding entry for the received packet to be retrieved at a high speed regardless of the number of the entries, stored in the table.

The filtering table and the priority control table as well as the filtering processor and the priority control processor which perform the retrieval, the update, and the result determination of those tables, included in the hardware portion of the conventional packet transferring apparatus, have an entry arrangement per packet for determining the transfer/abandonment and the priority degree per each packet which arrives at the packet transferring apparatus.

Accordingly, there has been a problem that it is impossible to perform the security control and the priority transfer control depending on such a session establishing direction that e.g. in a communication relating to a certain application the communication started by the external network is generally prohibited or treated with a low priority, while the communication started by the internal network is permitted or treated with a high priority. This will be described more specifically.

In case of the TCP communication of FIG. 3A, for instance, packets ① and ③ cannot be distinguished by the filtering condition shown in FIG. 12A. This is because both packets ① and ③ are sent from the terminal 62 belonging to the external network. However, the packet ③ belongs to a series of communication arising from the packet ② sent from the terminal 11 originally belonging to the internal network, while the packet ① belongs to a communication arising from the packet ① sent from the terminal 62 originally belonging to the external network. Therefore, the packet transferring apparatus must distinguish the packet ① from the packet ③ to perform the abandonment/transfer.

For this distinction, it is necessary to define the information for identifying not each packet per se but the subsequent packet (e.g. packet ③) based on the attribute of a previous packet (e.g. packet ②). This definition enables the security control and the priority transfer control to be performed depending on the session establishing direction.

In order to perform the security control and the priority transfer control depending on the above-mentioned session establishing direction, a security control/priority transfer processor for performing this process has only to be newly provided within the packet transferring apparatus.

At this time, it is required that the security/priority transfer processor is also arranged in the packet transferring apparatus to adequately cooperate with the routing processor, the filtering processor, and the priority control processor arranged within the packet transferring apparatus in the order shown in FIG. 11.

Thus, it becomes possible to realize a high-speed packet transferring process by preventing the packet transferring process performed by the packet transferring apparatus from being delayed and by omitting redundant processes overlapped at the processors.

Such an adequate cooperation can be exemplified by such a cooperation with the routing processor that the security/priority transfer processor performs the process to the received packet, thereby refraining from the routing process in the presence of the determination by the transmitting interface.

Accordingly, there has been a problem that the conventional packet transferring apparatus neither can detect the session nor consequently can define the information for identifying a specific packet nor perform the security control and the priority transfer control based on the defined information.

Also, there has been a problem that the conventional packet transferring apparatus redundantly retrieves even the packet which does not require the retrieval of the routing table and the filtering table, resulting in a disadvantage for enhancing the speed of the packet transferring process.

Furthermore, since the filtering table and the priority control table included by the conventional packet transferring apparatus of FIG. 11 store the entries with the mask values indicating the ranges of the field values by e.g. a software which the network manager uses for the setting, the number of the entries per se is few. However, since a newly provided session management table for solving the above-mentioned problems stores the entries based on the inter-terminal communication, there has been a problem that the number of the entries possessed by the session management table becomes large and an available memory capacity for mounting the session management table becomes enormous.

SUMMARY OF THE INVENTION

It is accordingly an object of the present invention to provide a packet transferring apparatus which can perform a security control and a priority transfer control corresponding to a session.

Also, it is an object to save an available memory capacity.

To achieve the above-mentioned object, the packet transferring apparatus according to the present invention schematically defines information for identifying a specific packet by detecting a session, executes a security control and a priority transfer control (a routing process, a filtering process and a priority control process by a main processor) based on the defined information, and performs a packet transfer at a high speed by transmitting a packet not through the main processor as to a packet of the same session analogized from a packet which has arrived before.

Namely, in the present invention, a session management processor and a session management table which compose a second portion, and a session establishment managing processor and a session establishment managing table which compose a first portion are newly added to the main processor of the packet transferring apparatus.

As shown in FIG. 1, if the received packet (at step S1) is a packet not managed as a session, it is processed in the order of the session management processor (at step S2)→routing processor (at step S3)→filtering processor (at step S4)→priority control processor (at step S5)→session establishment managing processor (at step S6)→switch portion→packet scheduling processor (at step S7), to be transmitted from the transmitting interface (at step S8).

On the other hand, if the received packet (at step S1) is a packet managed as a session (at step S2), the routing process (at step S3), the filtering process (at step S4), the priority control process (at step S5), and the session establishment control process (at step S6) are not performed. The packet is directly transferred to the switch portion and the packet scheduling processor (at step S7) for the transmission thereof (at step S8), so that the packet is transferred at a high speed without performing the above-mentioned redundant processes.

The session establishment managing processor is arranged at the subsequent stage of the priority control processor which composes the main processor to store/update/delete the entries which can identify the packet whose session is to be established in the session establishment managing table under the control of the security control software, the priority control software, or the like, as mentioned above.

After receiving the packet from the main processor, the session establishment managing processor retrieves the session establishment managing table. If there is found a conformed entry in the session establishment managing table, the session establishment managing processor requests the session management processor to store packet information of the subsequent packet of the same session (entry having a field which can be identified from the header of the packet and a field storing information obtained as a result of the processes so as to transfer the packet without performing the routing process, the filtering process, and the priority control process by the main processor at the subsequent stage) in the session management table.

The session management processor is arranged at the preceding stage of the routing processor which composes the main processor, and stores the packet information (entry) in the session management table based on the above-mentioned request. After receiving the packet, the session management processor retrieves the session management table based on the packet information (field values of the packet header). If there is found a conformed entry, (the time stamp of the entry is updated), the packet information (receiving/transmitting interface Nos., priority degree, and destination physical address (destination MAC address)) stored in the entry is notified to the switch portion, and the packet is transmitted to the switch portion by bypassing the main processor.

If the packet is conformed with the entry of the session management table and a flag is set indicating that the packet is for starting a session closure, the session management processor stores it in the entry. When the session is closed by a subsequent reception response packet for closure, such a process that the entry is deleted from the session management table is performed at the time of the session closure.

It is to be noted that when the received packet is not conformed with any entry of the session management table, the session management processor transfers the packet to the routing processor in the same way as the prior art.

Thus, in the present invention, the session management processor, the session management table, the session establishment managing processor, and the session establishment managing table are arranged at an adequate process stage of the packet transferring apparatus. The information (packet information) for identifying a specific packet is defined by detecting the session. The security control and the priority transfer control executed based on the defined information are processed in cooperation with the main processor at the hardware portion of the packet transferring apparatus. The packet which can be analogized from the packet which has arrived before is transmitted by bypassing the main processor. Accordingly, such an object that the packet transfer is performed at a high speed can be achieved.

Also, in order to save an available memory capacity, as to e.g. the IP address and the port No. in the field values of the entry, a number space used via the packet transferring apparatus in the actual network operation status is less compared with all of the number space. In such a case, therefore, indexes corresponding to the number of patters required for each field value may be attached, so that a table may be composed of the combination of the indexes.

It is to be noted that when retrieving the session management table finds no conformed entry, the second portion may invert constituent information of each entry to repeat the retrieval.

Also, when a communication form comprises the TCP communication, the (determination for) establishment or closure of the session may be performed with a code bit of a packet format.

For instance, the second portion may use FIN of the code bit as a session closure flag, receive a packet in which the flag is set, perform the (determination for) session closure when the session management processor further receives a subsequent reception response packet for closure, and delete the conformed entry in the session management table.

Furthermore, the second portion may use RST of the code bit as a session closure flag, perform the (determination for) session closure after receiving a packet in which the flag is set, and delete the conformed entry in the session management table.

Moreover, without any transmission/reception of the packet for more than a predetermined time except the above-mentioned session closure, then the second portion may perform the (determination for) session closure, and delete the conformed entry of the session management table.

On the other hand, when the communication form comprises the UDP communication, the session establishment managing table may include a UDP session establishment data table which holds bit patterns of a part of an application data portion following a UDP packet header, and the session establishment managing processor may retrieve the session establishment managing table and the UDP session establishment data table to perform the (determination for) session establishment.

Also in this case, without any transmission/reception of the packet for more than a predetermined time, then the second portion may perform the (determination for) session closure and delete a conformed entry of the session management table.

Also, a mask data table may be attached to each of the tables.

BRIEF DESCRIPTION OF THE DRAWINGS

FIGS. 3A and 3B are diagrams showing a packet flow at the time of a session establishment;

FIGS. 4A and 4B are diagrams showing a packet flow at the time of a session closure;

FIGS. 5A–5D are charts showing a session establishment managing table used for a packet transferring apparatus according to the present invention;

FIG. 6 is a chart showing a session management table used for a packet transferring apparatus according to the present invention;

FIGS. 9A–9E are charts showing an example of a session management table where an available memory capacity is saved in a packet transferring apparatus according to the present invention;

FIGS. 12A and 12B are charts showing a filtering table; and

FIGS. 13A and 13B are block diagrams each showing a format of a general packet.

Throughout the figures, like reference numerals indicate like or corresponding components.

DESCRIPTION OF THE EMBODIMENTS

Figure 1:
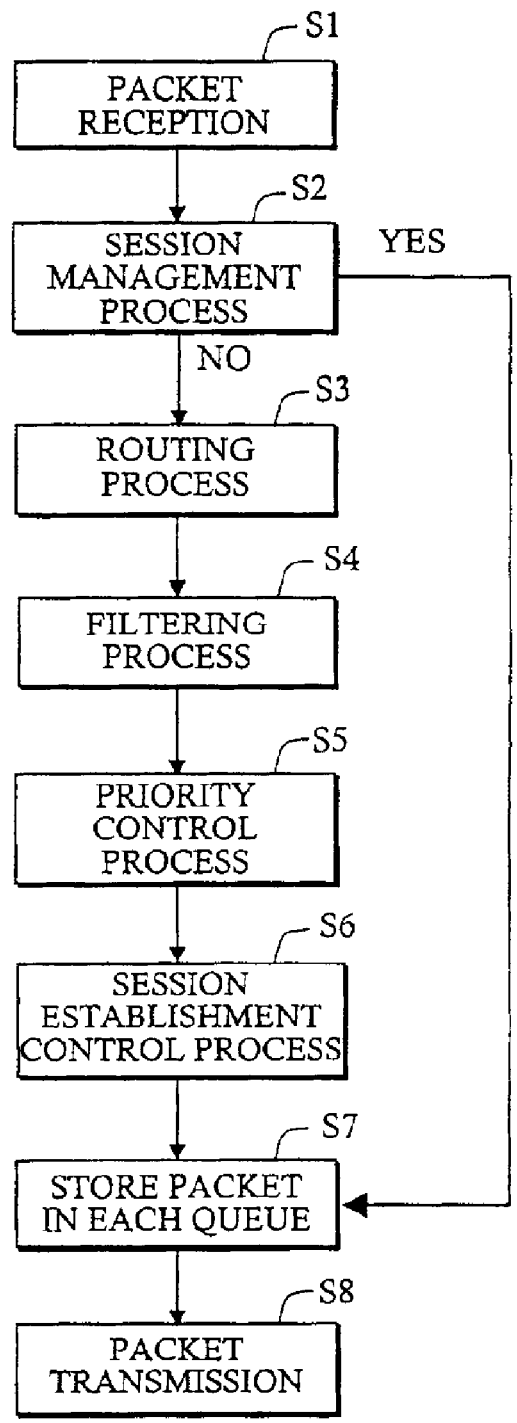
FIG. 1 is a flow chart showing a process concept of a packet transferring apparatus according to the present invention.
Figure 2:
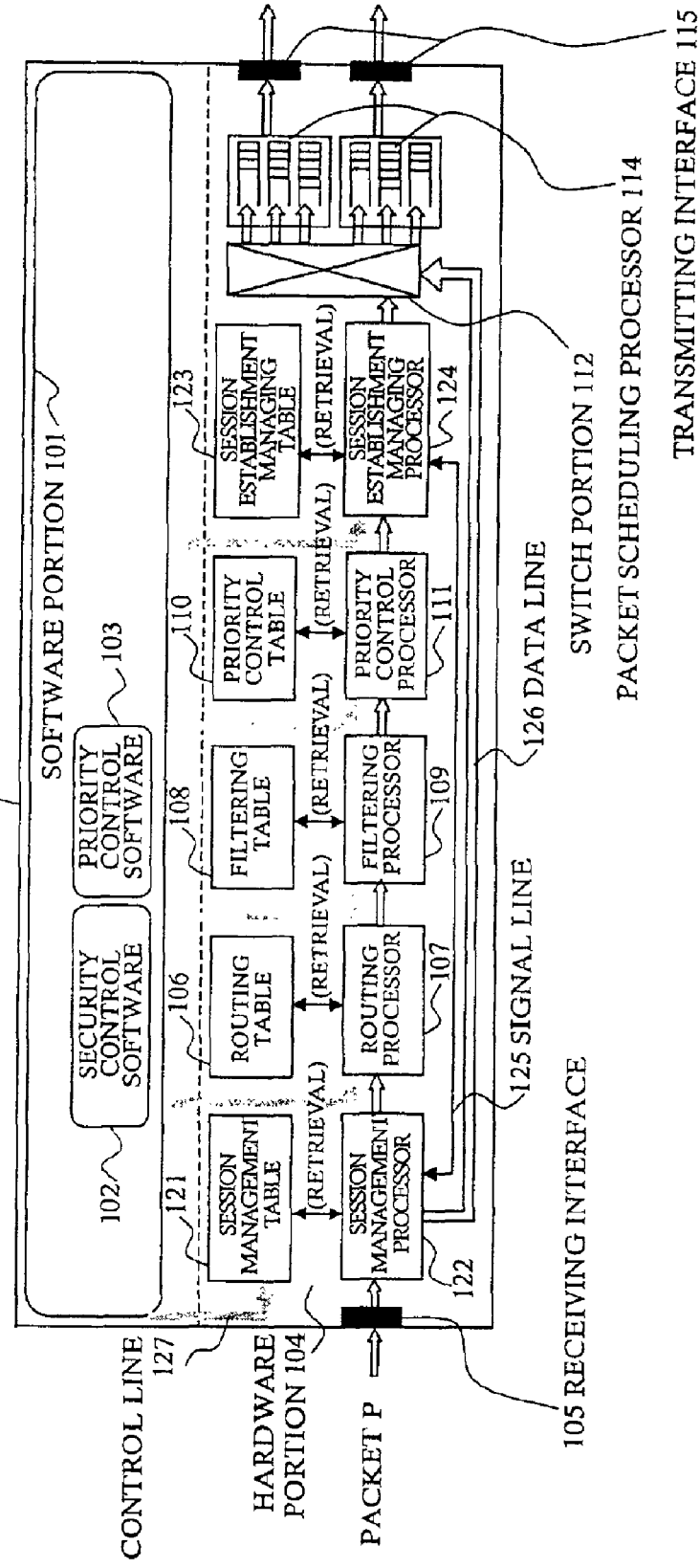
FIG. 2 is a block diagram showing an embodiment of a packet transferring apparatus according to the present invention.
Figure 11:
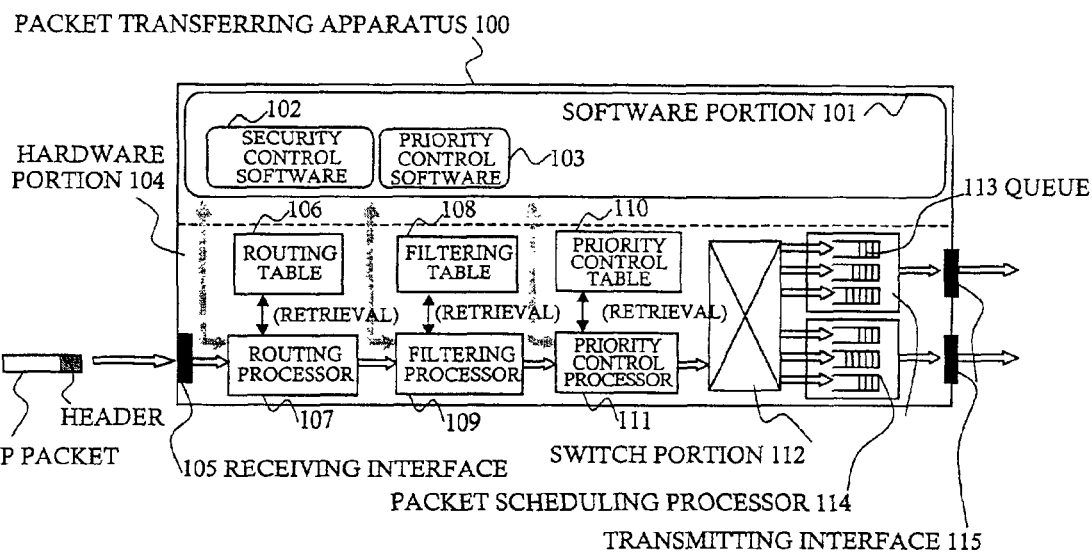
FIG. 11 is a block diagram showing an example of a prior art packet transferring apparatus.

FIG. 2 shows an embodiment of a packet transferring apparatus 100 according to the present invention. In this embodiment, a session management processor 122 having a session management table 121 is provided between the receiving interface 105 and the routing processor 107 in the packet transferring apparatus 100 already shown in FIG. 11, and a session establishment managing processor 124 having a session establishment managing table 123 is provided between the priority control processor 111 and the switch portion 112. The processors 122 and 124 are directly connected to a signal line 125 and a packet is directly transmitted from the processor 122 to the switch portion 112 through a data line 126.

Figure 10:
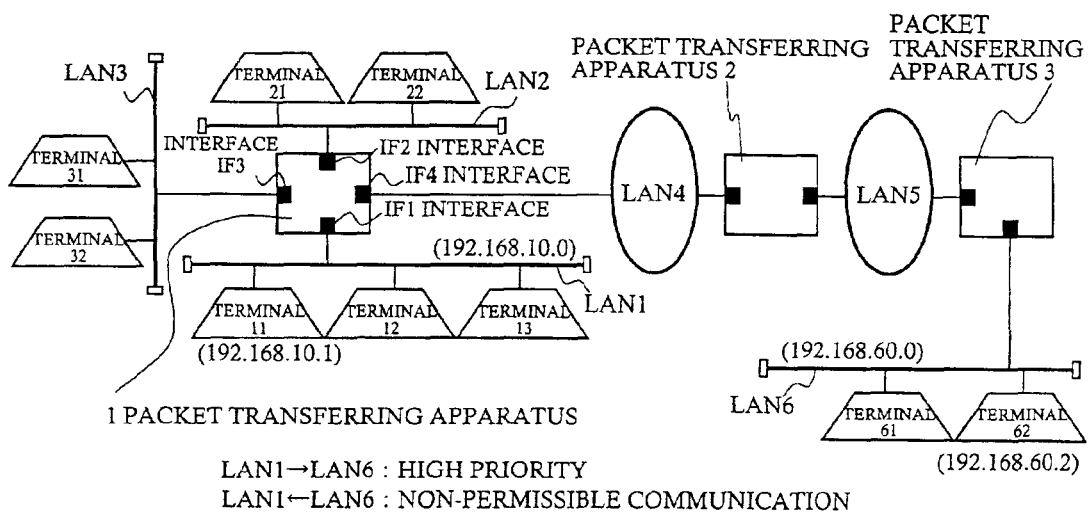
FIG. 10 is a block diagram showing a general network arrangement including a packet transferring apparatus.

This packet transferring apparatus 100 performs such a security control and a priority transfer control that in a general network arrangement shown in FIG. 10 for instance, the packet which the terminal group belonging to the LAN1 transmits to the terminal group belonging to the LAN6 with the "telnet" communication which is one of the TCP applications is treated with a high priority while the communication of the packet which the terminal group belonging to the LAN6 transmits to the terminal group belonging to the LAN1 with the TCP communication is not permitted.

It is now assumed that an IP network address of the LAN1 is 192.168.10.0 (net mask=255.255.255.0), that of the LAN6 is assumed to be 192.168.60.0 (net mask=255.255.255.0), an IP address of the terminal 11 is 192.168.10.1, and that of the terminal 62 is 192.168.60.2.

It is to be noted that in this embodiment, the packet transferring apparatuses 1–3 in FIG. 10, the packet transferring apparatus 100 in FIG. 2, and the packet transferring apparatus 100 in FIGS. 3 and 4 are assumed to be substantially identical with each other. Also, FIG. 5 shows the session establishment managing table 123 provided in the packet transferring apparatus 100 of FIG. 2, and FIG. 6 shows the session management table 121.

Furthermore, FIG. 3A shows a packet flow when the TCP session is established, in which the example of the telnet communication between the terminal 11 belonging to the LAN1 and the terminal 62 belonging to the LAN 6 is shown. This example shows that the packet transferring apparatus 100 does not transfer the packet ① whose source is the terminal 62 but abandons it, while the packet transferring apparatus 100 transfers the packet ③.

Hereinafter, the process executed by the packet transferring apparatus shown in FIG. 2 at the time of the session establishment of the TCP communication will be described as time elapses in FIG. 3A.

When the packet ① which the terminal 62 has transmitted arrives at the packet transferring apparatus 100 in the TCP communication between the terminals 11 and 62, the packet transferring apparatus 100 abandons the packet ①, as mentioned above because this is the TCP communication in which the terminal group belonging to the LAN6 has called the terminal group belonging to the LAN1.

In order to execute this abandonment, according to the network management policy "The TCP communication in which the terminal group belonging to the LAN6 has called the terminal group belonging to the LAN1 is not permitted.", the network manager preliminarily stores, in the filtering table 108 through the security control software 102, an entry whose protocol No. is TCP, source IP address is 192.168.60.0 (mask value 255.255.255.0), destination IP address is 192.168.10.0 (mask value 255.255.255.0), and "transfer/abandonment" field value is abandonment, as shown in the filtering condition 305 and the corresponding mask data 309 of FIGS. 12A and 12B.

The filtering processor 109 determines that the packet ① conforms with or hits this entry to abandon the packet ①, as described in the prior art example.

When the packet ② which opens the telnet communication arrives at the packet transferring apparatus 100, the transfer process is performed with a high priority to the packets ③, ④, and the like whose source packet is the packet ② by the packet transferring apparatus 100 because this is the telnet communication in which the terminal group belonging to the LAN1 has called the terminal group belonging to the LAN6.

Namely, in order to execute this transfer process, according to the network management policy "The transfer process is performed with high priority to the telnet communication in which the terminal group belonging to the LAN1 has called the terminal group belonging to the LAN6.", the network manager preliminarily stores in the session establishment managing table 123 through the priority control software 103, an entry whose protocol No. is TCP, source IP address is 192.168.10.0 (mask value 255.255.255.0), destination IP address is 192.168.60.0 (mask value 255.255.255.0), destination port No. is 23 (indicates the telnet communication), and "priority degree/transfer" field is 7 (high priority), as shown in a session establishment condition 801 and the corresponding mask data 805 of FIG. 5.

On the other hand, SYN bit of a code bit (another name CTR (control) flag) for the TCP packet format shown in FIG. 13 is set in the packet at the beginning of the session establishment until the session of the TCP communication is established on the specification of the TCP communication. Therefore, the SYN bit will be hereinafter referred to as CTR. The session establishment managing processor 124 retrieves the session establishment managing table 123 with the code bit being made a trigger to determine whether or not the packet ② conforms with or hits the entry of the session establishment condition 801 and the corresponding mask data 805.

Figure 7:
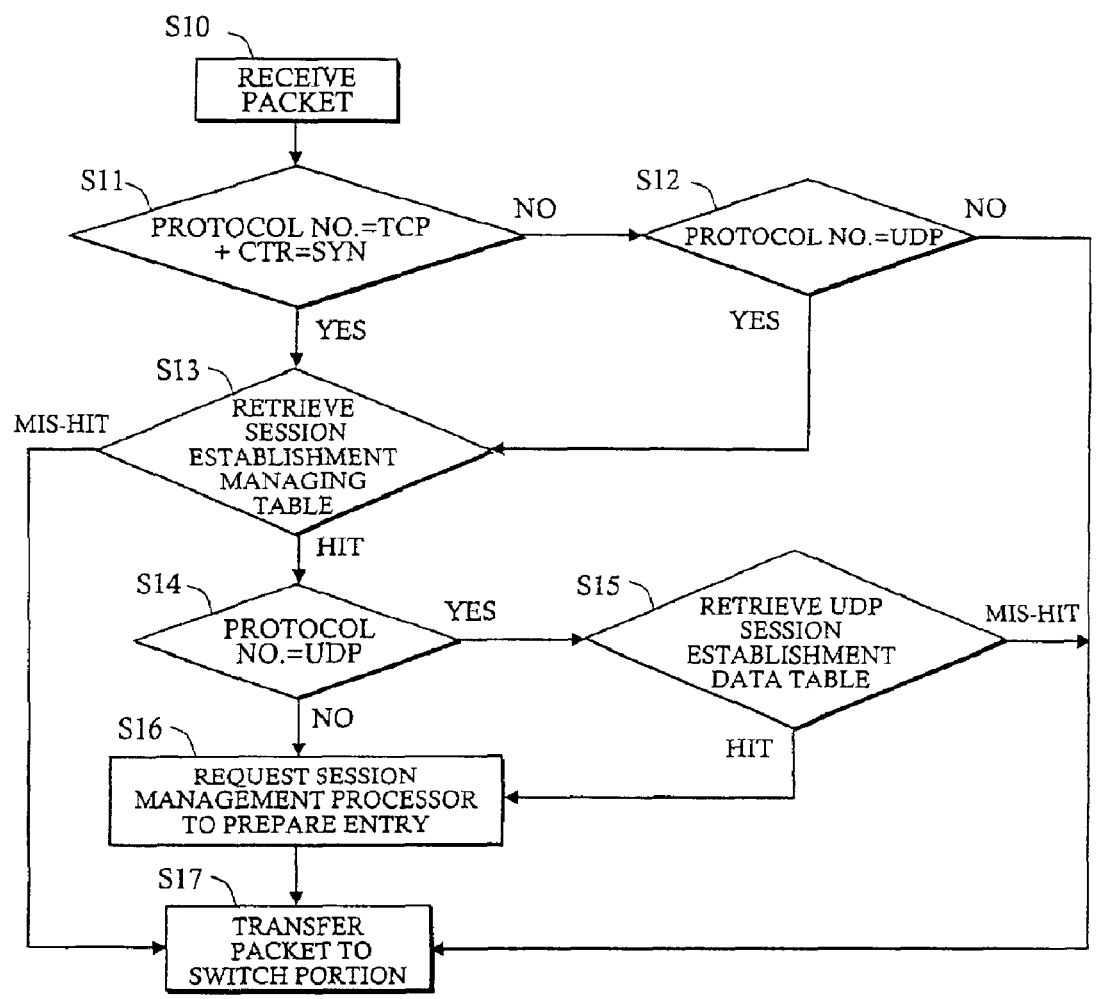
FIG. 7 is a flow chart showing a process procedure of a session establishment managing processor used for a packet transferring apparatus according to the present invention.

The above-mentioned procedure corresponds to steps S10, S11, and S13 of the session establishment managing processor 124 shown in FIG. 7.

The session establishment managing processor 124 requests the session management processor 122 based on the determination that there has been found a conformed entry to transfer the subsequent packets ③ and ④ with a higher priority following the packet ② and to prepare the entry for identifying the packets ③ and ④.

Upon requesting, the session establishment managing processor 124 obtains the protocol No., the source/destination IP addresses, the source/destination port Nos. from the header of the received packet, and reads the priority degree from the session establishment condition table shown in FIG. 5A. The session establishment managing processor 124 obtains the receiving/transmitting interface Nos. and the destination MAC address which the processor at the preceding stage of the session establishment managing processor 124 has notified together with the packet to the session establishment managing processor 124, and simultaneously notifies these data to the session management processor 122.

When the data are thus notified between processors, the notification from the preceding stage to the subsequent stage is executed by adding its own in-apparatus header for performing the control within the apparatus e.g. ahead of the packet header.

On the other hand, the data notification not from the preceding stage to the subsequent stage but from the session establishment managing processor 124 to the session management processor 122 (the data notification from the subsequent stage to the preceding stage) is executed through the signal line 125 between the session establishment managing processor 124 and the session management processor 122. Accordingly, not the network manager but the session management processor 122 dynamically prepares a session management entry 901 which can identify the packets ③ and ④ in the session management table of FIG. 6 according to the request from the session establishment managing processor 124.

This procedure corresponds to steps S14 and S16 in the flow chart of FIG. 7. Since the protocol No. is TCP, the process goes to step S16 through step S14.

After receiving the signal for confirming the above-mentioned request, the session establishment managing processor 124 transfers the received packet to the switch portion 112 (at step S17). The switch portion 112 stores the received packet in the corresponding queue 113 depending on the transmitting interface No. and the priority degree of the packet, so that the packet scheduling processor 114 sends out the received packet from the transmitting interface 115.

When the packet ③ arrives at the packet transferring apparatus 100, the packet transferring apparatus 100 performs the transfer process with a high priority to the packet ③ since the packet transferring apparatus 100 performs the transfer process with a high priority with respect to the telnet communication in which the terminal group belonging to the LAN1 has called the terminal group belonging to the LAN6.

Figure 8:
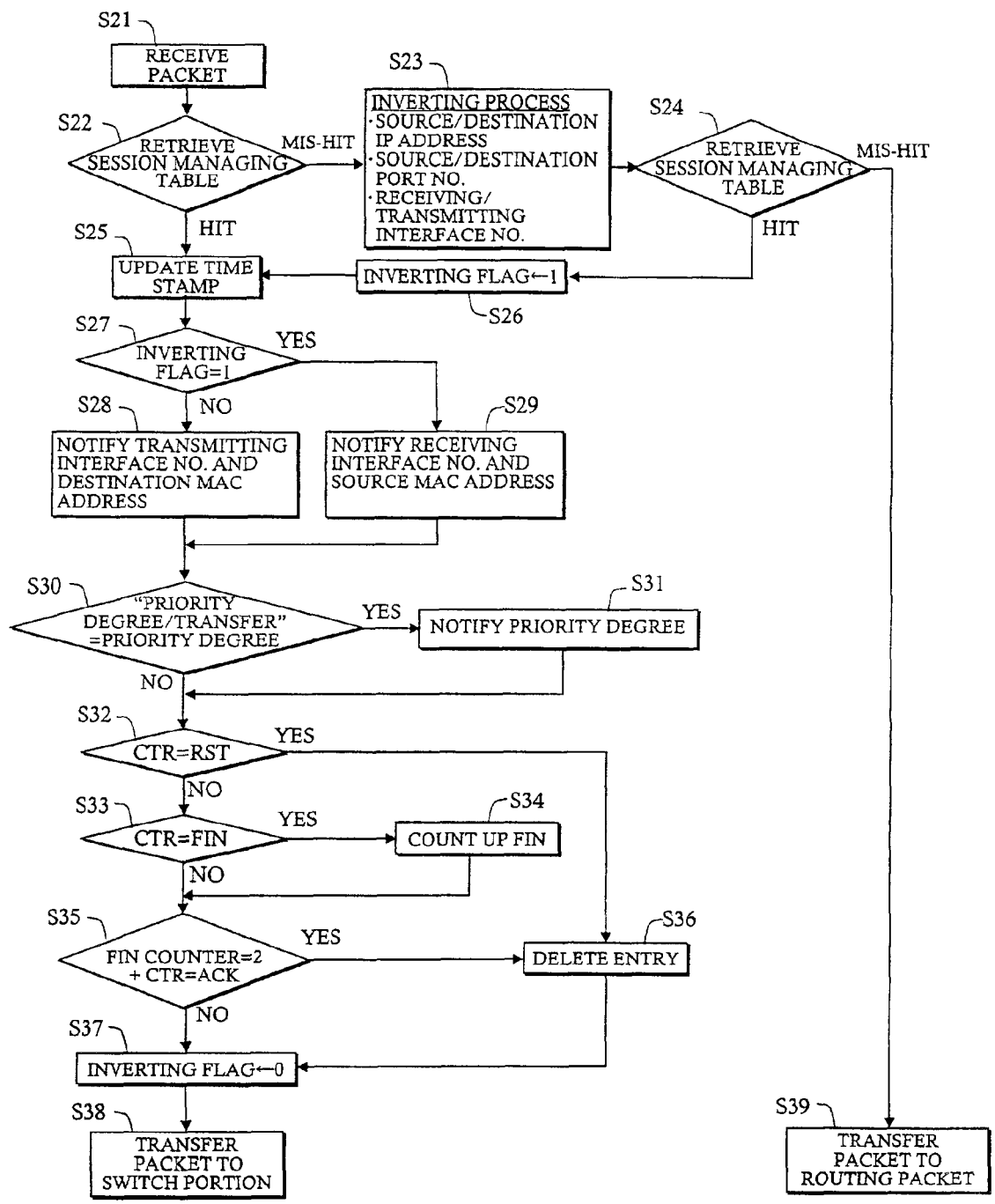
FIG. 8 is a flow chart showing a process procedure of a session management processor used for a packet transferring apparatus according to the present invention.

Namely, when receiving the packet ③, the session management processor 122 retrieves the session management table 121. This procedure corresponds to steps S21 and S22 in the flow chart of the session management processor 122 shown in FIG. 8.

Even if the session management processor 122 retrieves the session management table 121, the packet ③ does not conform with or mis-hits the session management entry 901 prepared by the session management processor 122 according to the request of the session establishment managing processor 124.

This is because the session management processor 122 prepares the session management entry 901, as mentioned above, so as to conform with or hit packet ④, i.e. only for the direction from the terminal 11 to the terminal 62.

Accordingly, step S23 is executed at which the source IP address is replaced by the destination IP address, the source port No. by the destination port No., and the receiving interface No. by the transmitting interface No., respectively. Then, the session management processor 122 again retrieves the session management table 121 (at step S24).

Since the packet ③ is now to conform with the session management table 121 for the first time, the session management processor 122 sets the flag indicating this fact (at step S26) to update the time stamp of the session management entry 901.

This time stamp is one of the indexes which the packet transferring apparatus 100 requires to determine whether or not the terminal is presently performing the telnet communication of the session management entry 901.

It is needless to say that when the received packet does not conform with the session management entries at the retrieval of step S24, the received packet is transmitted as it is to the routing processor 107 (at step S39).

Since the session management processor 122 hits the entry after performing the inverting process to the session management entry 901, the transmitting interface No. and the destination MAC address of the packet ③ respectively known as the receiving interface No. and the source MAC address are directly notified to the next processor of the switch portion 112 (at steps S27 and S29).

At the same time, the priority degree known from the session management entry 901 is directly notified to the switch portion 112 (at steps S30 and S31).

Then, the session management processor 122 restores the inverting flag (at step S37) through the process (as will be described later) of steps (S32–S36) for deleting the corresponding session management entry after the completion of the telnet communication, and transmits the received packet to the switch portion 112 (at step S38) at the same time when the notification of the transmitting interface No., the destination MAC address, and the priority degree to the switch portion 112.

It is to be noted that the data line 126 is provided as mentioned above in order to notify the packet and the data annexed to the packet from the session management processor 122 to the switch portion 112. The session management processor 122 performs the processes (except steps S29, S34, and S36) of FIG. 8 as mentioned above to the packet ③ whereby the packet transferring apparatus 100 preferentially transfers the packet ③ at the switch portion 112 and the following portions, and can perform the packet transferring process at a high speed without performing the processes to be executed at the redundant routing processor 107, filtering processor 109, priority control processor 111, and session establishment managing processor 124.

Furthermore, when the packet ④ arrives at the packet transferring apparatus 100, in the telnet communication in which the terminal group belonging to the LAN1 has called the terminal group belonging to the LAN6, the packet transferring apparatus 100 performs the transfer process with a high priority to the packet ④, since the packet transferring apparatus 100 performs the transfer process with a high priority. At this time, the session management processor 122 finds that the session management entry 901 conforms with the packet ④ at a single retrieval. Otherwise, the processes of FIG. 8 (except steps S23, S24, S26, S29, S34, S36, and S39) are executed in the same way as the above case of the packet ③.

By executing the processes in this way, the packet transferring apparatus 100 preferentially transfers the packet ④ at the switch portion 112 and the following portions, so that it can perform the packet transferring process at a high speed without performing the processes executed at the redundant routing processor 107, filtering processor 109, priority control processor 111, and session establishment managing processor 124.

Hereinafter, the process executed by the packet transferring apparatus 100 at the time of the session closure in the TCP communication will be described as time elapses in FIG. 4A.

While in the above-mentioned embodiment, the process executed by the packet transferring apparatus 100 at the time of the establishment of the TCP communication has been described, the packet transferring apparatus 100 is required to execute the process of such as deleting an unnecessary entry from the session management table 121 even when the TCP communication is finished.

This is because the session management processor 122 dynamically adds entries to the session management table 121 shown in FIG. 6 depending on the session establishment condition of the session establishment managing table 123 shown in FIG. 5 every time the inter-terminal communication across the packet transferring apparatus 100 begins so that the number of the entries may exceed the capacity of the table 121 during the operation of the packet transferring apparatus without an adequate deletion of some entries.

As for the closure of the TCP session, there is an FIN closure (FIG. 4A), an RST closure (FIG. 4B), or an abnormal end except the FIN closure and the RST closure.

In the FIN closure, the terminals 11 and 62 mutually transmit/receive the packets ① and ② each other whose CTR flag (see FIG. 13A) of the TCP packet header is the FIN, and a reception response packet (CTR flag is ACK) ③ for the packets ① and ② which are the FIN is sent to close the session. In the RST closure, either the terminal 11 or 62 transmits the packet ① whose CTR flag is the RST to immediately close the session.

In case of the FIN closure, when the packet transferring apparatus 100 receives the packet ① whose CTR flag of the TCP packet header is the FIN, the session management processor 122 counts up an FIN counter field value of the session management entry 901 with which the packet ① conforms. This procedure corresponds to steps S33 and S34 in FIG. 8.

Since the FIN counter is "1" at the time of receiving the packet ①, the session management processor 122 executes the processes in the order of steps S35, S37, and S38 to transfer the received packet ① to the switch portion 112, so that the switch portion 112 preferentially transfers the packet ①.

The packet ① is a packet which the terminal 11 has sent. In response, the terminal 62 transmits the reception response packet to the terminal 11, and further transmits the packet ② whose CTR flag is the FIN to the terminal 11.

When the packet transferring apparatus 100 receives the packet ②, the session management processor 122 counts up the FIN counter field value of the session management entry 901 with which the packet ② conforms. This procedure corresponds to steps S33 and S34.

The session management processor 122 executes step S35 at which the FIN counter is "2" and the CTR flag is not the ACK, so that it executes the processes in the order of steps S37 and S38 in the same way as the case of the packet ①.

The terminal 11 which has received the packet ② transmits the reception response packet ③ to the terminal 62. When the packet transferring apparatus 100 receives the packet ③, the session management processor 122 executes step S35 at which the FIN counter is "2" and the CTR flag of the packet ③ is the ACK, so that it deletes the session management entry 901 with which the packet ③ conforms (at step S36).

The session management processor 122 thus executes the process whereby the TCP communication can be finished at the time of the FIN closure so that the unnecessary entry can be deleted. Accordingly, after this process the packet ④ is abandoned by the filtering processor 109 since the packet ④ is a packet of the TCP communication in which the terminal group belonging to the LAN6 has called the terminal group belonging to LAN1.

Also when the packet ① whose CTR flag is the RST is received in case of the RST closure, the session management processor 122 deletes the session management entry 901 with which the packet ① conforms. This procedure corresponds to steps S32 and S36.

Accordingly, after this process the packet ② is abandoned by the filtering processor 109 since the packet ② is a packet of the TCP communication in which the terminal group belonging to the LAN6 has called the terminal group belonging to the LAN1.

In addition, when the session closure is not a normal end as mentioned above but an abnormal end due to the disconnection of a transmitting medium or the like, the security control software 102 or the priority control software 103 periodically checks the time stamp of the entries in the session management table 121 to delete the entry in which the transmission/reception of the packet does not occur even after a predetermined time has passed which the network manager or an apparatus designer in the software has set.

The time stamp of the session management entry 901 is updated (at step S25) by the session management processor 122 every time the packet transferring apparatus 100 receives the packet in conformity with the entry.

Also in order that the security control software 102 or the priority control software 103 accesses the session management table 121 as mentioned above, a control line 127 is provided from the software portion 101 to the session management table 121.

FIGS. 9A–9E show an example of a session management table in which an available memory capacity is saved when a CAM is used as an available memory device. The CAM is a memory device in which it does not read the entries which can be a comparative object one by one for a comparison with a retrieval key, but retrieves the entries in parallel at one time to determine the hit/mis-hit of the entries. Therefore, the CAM has such a characteristic that it can perform retrievals at a high speed whereas the total bit length of a single entry can not be elongated.

Accordingly, if the session management table 121 is arranged as a single table as shown in FIG. 6, and the other field values are identical except e.g. the source port No., an index can be attached and held with the other field values being made a single entry. Composing the session management table by the combination of the index value and the source port No. will lead to saving the available memory capacity.

The IP communication has such a characteristic that the destination port No. at the time of the session establishment assumes a limited kind of port Nos. of well known port, and that the kinds of the combination of IP addresses transmitted/received through the packet transferring apparatus 100 are also fewer compared with the whole address space.

It is preferable that the session management table where the available memory capacity is saved is constructed by diving the fields into a CAM-1, a CAM-2, a CAM-3, and a CAM-4, as shown in FIGS. 9A–9E in view of the bit length of the fields of the session management table to hold the index values in a CAM-5.

In the embodiment of FIGS. 9A–9E, as shown in the CAM-4 of FIG. 9D, the MAC address is not directly stored in the table but the pointer of the other table is stored in which the MAC address is stored. This is because the MAC address has 48 bit-length and it is difficult to store the MAC address in a single CAM by the same reason as above-mentioned.

Since in the retrieval of the session management table the MAC address is not a key for retrieval, but has contents required if there were a hit entry after the distinction of a hit entry, the retrieval operation to the session management table is not delayed by the storage with the pointer. In addition, another table storing the MAC address comprises e.g. the routing table 106, so that areas of the routing table 106 and the MAC address can be shared.

While the TCP communication is mentioned in the above-mentioned embodiment, the case of the UDP communication will now be described.

The apparatus arrangement shown in FIG. 2 can also realize the packet transferring apparatus which performs such a security control that a communication of a DNS (Domain Name Service) which is one of the applications of the UDP communication in which the terminal group belonging to the internal network of the LAN1, LAN2, and LAN3 has called the external network of the LAN4, LAN5, and LAN6 in the network arrangement as shown in FIG. 10 is permitted, while the UDP communication in which the terminal group belonging to the external network has called the terminal group belonging to the internal network is not permitted.

Namely, FIG. 3B shows the packet flow at the time of the session establishment in the UDP communication, while FIG. 13B shows the packet format of the UDP. The flag indicating the session establishment does not exist in the connectionless type of UDP communication, different from the connection type of TCP communication.

Accordingly, a bit pattern of a part of an application data portion following the UDP header is stored as a UDP session establishment data table (FIG. 5C) and the corresponding mask data table (FIG. 5D) within the session establishment managing table 123 so that the packet transferring apparatus 100 may identify a Request packet which starts the session per individual application communicated on the UDP, i.e. per each destination port No. of the UDP.

The packet transferring apparatus 100 retrieves the UDP session establishment data table in addition to the session establishment condition table (FIG. 6A) for the received UDP packet whereby whether or not the session management processor 122 should manage the UDP communication to which the received UDP packet belongs is determined.

The security control software 102 and the priority control software 103 has preliminarily stored the entry in the UDP session establishment data table in the session establishment managing table 123.

When the packet transferring apparatus 100 receives the packet ① in FIG. 3B, the filtering processor 109 abandons the packet ① since it is the UDP communication in which the terminal group belonging to the external network has called the terminal group belonging to the internal network.

When the packet transferring apparatus 100 receives the packet 2, the session establishment managing processor 124 retrieves the session establishment managing processing table 123. As a result, the packet 2 is hit by a session establishment condition entry 802 common to a session establishment condition entry 802 whose protocol No.= UDP, destination port No.=53, and receiving interface No.= interface IF1 which the security control software 102 has preliminarily prepared in the session establishment condition table, a session establishment condition entry 803 whose receiving interface No.=interface IF2 prepared in the same way, or a session establishment condition entry 804 whose receiving interface No.=IF3 prepared in the same way. This corresponds to steps S12 and S13 in the flow chart shown in FIG. 7.

Since the protocol No.=the UDP (at step S14), the session establishment managing processor 124 retrieves the UDP session establishment data table. As a result, since the UDP session establishment data entry 807 and the leading bit pattern of the application data of the received packet whose destination port Nos. for DNS are 53 are mutually conformed (at step S15), the session establishment managing processor 124 recognizes the packet ② as the Request packet.

Accordingly, the session establishment managing processor 124 requests (at step S16) the session management processor 122 in the same way as the above-mentioned embodiment to prepare the entry by which the subsequent packets ③ and ④ can be identified, and transfers the packet ② to the switch portion 112 (at step S17).

Likewise, when the packet transferring apparatus 100 receives the packet ③ or ④, the session management table 121 has an entry by which the session management processor 122 can identify the packet ③ or ④ and in which the transfer of the packet ③ or ④ is instructed whereby the packet transferring apparatus 100 can transfer the packet ③ or ④, which is the packet of the DNS communication in which the terminal belonging to the internal network of the LAN1 has called the external network of the LAN6.

As for the session closure, the flag or the like indicating the end of the communication do not exist within the UDP header in the connectionless type of UDP communication, different from the connection type of TCP communication. The session closure in the UDP communication can be performed by that the security control software 102 or the priority control software 103 periodically checks the time stamp of the session management table 121 to delete the entry in which the transmission/reception of the packet does not occur even after a predetermined time has elapsed which the software has set.

As described above, a packet transferring apparatus according to the present invention is arranged such that a packet outputted from a main processor for executing a routing process, a filtering process, and a priority control process is determined whether or not to be conformed with a session establishment condition, when the packet is determined conformable, packet information is received and held from the determining portion, and subsequent packets belonging to the same session are provided to a bypass of the main processor, based on the packet information. Therefore, the packet transferring apparatus according to the present invention is effective in reducing a redundant process and to transfer the packet at a high speed.

Also, when a CAM is used for an available memory device, a single table is composed by a plurality of fields considering a bit length of field values, indexes of the number of kinds required for each table entry are attached, and a session management table is composed of the combination of the indexes, whereby the packet transferring apparatus according to the present invention is effective for a session management process with an available memory capacity being saved.

What we claim is:

1. A packet transferring apparatus which communicates between terminals belonging to networks comprising:
    a main processor for executing a routing process, a filtering process, and a priority control process,
    a first portion, arranged at a subsequent stage of the main processor, for determining whether or not a packet outputted from the main processor is conformable with a session establishment condition, and
    a second portion, arranged at a preceding stage of the main processor, for receiving and holding packet information from the first portion when the first portion determines that the packer is conformed with the session establishment condition and for providing a bypass of the main processor with subsequent packets belonging to a same session, based on the packet information.

2. The packet transferring apparatus as claimed in claim 1 wherein the first portion comprises a session establishment managing table where the packet information and priority information are preset according to a network management policy, and a session establishment managing processor for retrieving the table to the network or not the packet is conformed with the session establishment condition.

3. The packet transferring apparatus as claimed in claim 2 wherein the second portion comprises a session management table for dynamically holding the packet information relating to the same session provided by the session establishment managing processor, and a session management processor for retrieving the session management table to provide the bypass with subsequent packets of the same session.

4. The packet transferring apparatus as claimed in claim 3 wherein when retrieving the session management table finds no conformed entry, the second portion inverts constituent information of each entry to repeat the retrieval.

5. The packet transferring apparatus as claimed in claim 3 wherein when a communication form is the TCP communication, an establishment or closure of the session is performed with a code bit of a packet format.

6. The packet transferring apparatus as claimed in claim 5 wherein the second portion uses an FIN of the code bit as a session closure flag, receives a packet in which the flag is set, closes the session when the session management processor further receives a subsequent reception response packet for closure, and deletes a conformed entry of the session management table.

7. The packet transferring apparatus as claimed in claim 5 wherein the second portion uses an RST of the code bit as a session closure flag, closes the session after receiving a packet in which the flag is set, and deletes a conformed entry of the session management table.

8. The packet transferring apparatus as claimed in claim 5 wherein without any transmission/reception of the packet for more than a predetermined time, the second portion closes the session and deletes a conformed entry of the session management table.

9. The packet transferring apparatus as claimed in claim 5 wherein when the communication form is the UDP communication, the session establishment managing table includes a UDP session establishment data table which holds bit patterns of a part of an application data portion following a UDP packet header, and the session establishment managing processor retrieves the session establishment managing table and the UDP session establishment data table to establish the session.

10. The packet transferring apparatus as claimed in claim 9 wherein without any transmission/reception of the packet for more than a predetermined time, the second portion closes the session and deletes a confirmed entry of the session management table.

11. The packet transferring apparatus as claimed in claim 9 wherein a mask data table is attached to each of the tables.

12. The packet transferring apparatus as claimed in claim 3 wherein the session management table attaches thereto indexes of a number of kinds required for each field value, and is composed of a combination of the indexes.

* * * * *